3,238,151
RESISTOR COMPOSITION
Kee Hyong Kim, Niagara Falls, N.Y., assignor to Air Reduction Company, Incorporated, New York, N.Y., a corporation of New York
No Drawing. Filed June 7, 1963, Ser. No. 286,202
9 Claims. (Cl. 252—518)

This application relates to electrical resistor manufacture and more particularly to conductive compositions suitable for resistors. The term "resistor" is used in a broad sense to designate (1) flat films or coatings applied by screen-printing, spraying, or dipping an insulator, (2) applications to cylindrical substrates in spiral fashion or with subsequent mechanical spiralling, and (3) volumetric resistors.

It is an object of the invention to provide an improved composition for the uses indicated; and to provide an improved method of making such compositions, and products made from these compositions.

Another object is the provision of a binary or multicomponent resistor composition of which the two or more components are inorganic and afford a wide latitude of resistance range by varying of their relative proportions.

A more particular object of the invention is to provide an electric resistor composition made of thallium oxide, and experience has demonstrated that thallium oxide is a unique material for electrical resistors when combined with glass, and especially a borosilicate glass. The inclusion of thallium oxide alone, accomplished either by a powder mix and sintering process or by forming an outright solution controlled under selected heating and cooling conditions, renders an inorganic glassy composition conductive.

Still another object is to provide a resistor composition of glass and thallium oxide which in intimate mixture or dispersion with one another readily form an ohmic contact, i.e., an extremely low resistance contact, with silver, gold or platinum terminals applied to the resistor composition.

Other objects are, according to one embodiment of the invention, to provide a multi-phase resistor composition comprising an amorphous glass phase as matrix, and a phase of electrically conductive, fine crystallites distributed throughout the matrix as a result of having been precipitated in situ therein; and also to provide, according to another embodiment of the invention, a sintered glassy resistor composition comprising undissolved conductive crystalline particle inclusions present in the glass and surrounded by intervening regions of glass enriched from the inclusions so as to be electrically conductive, thereby resulting in an overall, low work function glass.

Another object of my invention is to provide an electrical resistor composition having increased stability over the resistance range. The composition of this invention achieves results superior to those of other resistor compositions including compositions employing expensive materials, such as the noble metals and/or their oxides. It is an advantage of this invention that it substantially reduces the cost of the resistors because the major materials are relatively inexpensive.

A further advantage of my composition, namely an appropriate amount of thallium oxide distributed throughout a matrix of inorganic glass, is that the composition affords a wide range of resistance, providing very low voltage coefficient of resistance (VCR), very low temperature coefficient of resistance (TCR), and low noise level. Because of the inorganic glass, the resistor composition is not sensitive to moisture, it is stable against electric load, and maintains dimensional stability of the final product.

Other objects, features and advantages of the invention will appear or be pointed out as the description proceeds.

The basic mix of the new resistor composition is thallium oxide and glass, and the preferred mix is made with thallic oxide ($Tl_2O_3$) and borosilicate glass frit. This mix is fired and makes a good resistor, irrespective of whether it is used in film form, coat form, or volumetric form. The majority of the thallium ions in the fired articles are in their highest oxidized state. The mix may consist of oxides of thallium other than thallic. It may contain thallium salts such as thallium hydroxide.

The borosilicate glass used is preferably a lead borosilicate glass; for example, a glass with constituents in the following ranges:

| | Wt. percent |
|---|---|
| $PbO$ | 45–85 |
| $B_2O_3$ | 2–19 |
| $SiO_2$ | 7–40 |
| $Al_2O_3$ | 0–3 |
| $Na_2O$ | 0–5 |
| Alkaline earth oxides (CaO, MgO, SrO, BaO) | 0–10 |

The proportion of thallium oxide to glass is in the folling permissible range:

| | Wt. percent |
|---|---|
| Thallium oxide | 95–20 |
| Glass | 5–80 |

The proportion is preferably within a narrower range, employing lead borosilicate glass, as follows:

| | Wt. percent |
|---|---|
| Thallium oxide | 50–25 |
| Lead borosilicate glass | 50–75 |

The oxide and glass should be powdered to a fine size, preferably less than 10 microns. Generally, in the examples given hereinafter, the oxide and glass were present in finely divided particles. Moreover, it is desirable to maintain the particle sizes fairly consistent to obtain good reproducible results, although the specific particle size selected is not critical.

More generally, fine thallium oxide ($Tl_2O_3$ and $Tl_2O$) powders (i.e. up to 50 wt. percent of $Tl_2O$ and balance $Tl_2O_3$) mixed and fired with a glass frit in a temperature range between 400° C. and 650° C. produce a stable composition yielding an electrical value of 50 ohms to 200K ohms or higher per square area, depending upon the proportion of glass frit and the heat treatment.

If thallium hydroxide (TlOH) is substituted for the $Tl_2O$ in the above example, i.e. 0–50 wt. percent TlOH and balance $Tl_2O_3$, and fired with the glass frit, a satisfactory and stable composition results. In this case, the TlOH dissociates under the head, the decomposition products of TlOH being thallium oxide which remains and water which is liberated from the composition.

Very good results are obtained using thallium oxides that are non-stoichiometric and highly conductive, and that have a high solubility in silicate glasses. Their ions are heavy and have an 18 or 18+2 electron structure which shields the effect of the nuclei and of electron orbits within the core to the valency electrons.

Not only is non-stoichiometric thallium oxide a highly conductive powder as indicated, but in general the powder has semi-metallic characteristics and has a very low TCR. Thallium oxide conducts possibly due to atomic orbital overlapping but, probably in largest measure, due to an oxygen deficiency or vacancy in the lattice, as distinct from holes as used in an electronic sense when referring to popular semi-conductive materials and devices.

The co-action of the thallium oxide and glass in producing the highly effective resistor composition of this invention is not precisely understood. The following hypothesis is not necessarily correct and is presented merely as an aid in better understanding the mechanism of this invention. It is believed that the conductive thallium oxide powder during the sintering process partially dissolves into the glass matrix, probably resulting in thallium ions being produced which are distributed so as to form a low work function glass. During the cooling period in the region of glass fused between and around undissolved thallium oxide particles, the dissolved thallium ions precipitate as recrystallized extremely fine particles to enrich this glass region.

In any case, cooling of the composition brings about a low TCR, a low VCR, and a property of wide resistance adjustment, even though the thin, enriched conductive glass may exist ostensibly as a sintered barrier region between the conductive undissolved thallium oxide particles. It is thought that the enriched glass barrier region performs a second function as an effective protective film around the thallium oxide particles so as to prevent the resistor characteristics from deteriorating. At all events, X-ray diffraction of a sintered $Tl_2O_3$-lead glass product shows precipitation of $Tl_2O_3$ in the glass and also a minor precipitation of lead oxide in the glass.

Resistance is higher when the proportion of glass to thallium oxide is higher and similarly, a reduction in the amount of thallium oxide increases the resistance. Firing conditions affect the resistance and the preferred firing condition is within the temperature range 475°–625° C. for a duration of 10–15 minutes. The composition can be fired at a broader range of temperatures from about 400° to 650° C. for a duration of 3 to 45 minutes when firing is employed as an expedient to adjust the electrical properties. Increases in the length of the firing period reduces the resistance, and so does the use of higher temperatures through any given period of firing time.

Metal powders are not necessary to improve the low resistance end of the resistance range of the present resistors, because the thallium oxide and lead borosilicate glass form an excellent resistor capable of low resistance. However, small additions of powdered metal such as gold, platinum, palladium, and silver in mixture or singly (e.g. about 10 wt. percent of silver powder), may be included in the frit-thallium oxide mix to achieve lower resistance values.

When small amounts of glass are used, the resistors of this invention afford generally the conductive characteristics of a metal, but they are not as conductive as copper.

Although the glass is actually the binder in the composition of this invention (after the mix has been fired), a temporary binder can be used in the mix when desired; for example, when a printing process is to be used, such as by the screen-printing of the composition in a coat upon a printed circuit substrate. The viscosity of the mix can be varied and the resistance can be increased in value with increases in the thickness of the coat or its width, or both, as printed.

When temporary binders are employed, as in instances of making the composition for printing, the following organic mixtures are used as the temporary binders:

| | Wt. percent |
|---|---|
| Ethylcellulose | [1] 0–15 |
| Butyl carbitol | [1] 10–45 |
| Synosol | 20–45 |

[1] Of the organics used.

The temporary binder is volatilized, and all of it is driven off by the firing operation.

In addition to temporary binders, fillers can be used for printed circuit applications where it is necessary to obtain resistance in the higher ranges. No filler is necessary for lower-range resistance of a printed circuit and thicknesses can be reduced to obtain higher resistance.

For other applications such as flat and cylindrical coats (on rods), or applications by dipping, spraying, or the like, fillers may be used to increase the resistance of the composition and the geometrical rigidity. Suitable inorganic fillers are rutile ($TiO_2$), MgO, CaO, SrO, BaO, $Al_2O_3$, and zirconia ($ZrO_2$). The preferred filler is rutile when the binder glass is lead borosilicate glass. Such fillers are to regarded as diluents in the mixture.

In the mixture systems thus far discussed, the glass frit serves as the filler and the thallium oxide is the conductant component. Moreover, the glass frit as previously indicated sinters or fuses and serves as the binder after the composition is fired.

The additional fillers described may be added to the composition when a volumetric resistor, also known as a filled or slug-type resistor, is desired. Up to 50% by weight of the mix comprises rutile as the filler, with the balance being thallium oxide and glass frit.

For example, a volumetric resistor was made of which the mix consisted of one part $TiO_2$, one part lead borosilicate glass, and one part $Tl_2O_3$. A slug of this mix was cold molded and then fired in accordance with the foregoing practices.

Resistor terminals, which can consist simply of a noble metal powder that is suspended in a flux, painted on in suitable spots, and then fired, are applied to my resistive composition in different ways depending upon the form of the resistor. The following specific examples, including the affixing of terminations, are given only to illustrate the differences, and not by way of limitation on the terminations or the overall resistor manufacture.

Example I

In the manufacture of volumetric resistors, a conductive thallium oxide powder, a lead borosilicate glass frit and rutile, in fine powder form less than a −325 mesh, were dry mixed in a mortar and pestle for half an hour. As a moistener to increase viscosity of the powder mixture, a temporary binder was added in small weight percentage, one such material being Carbowax 1% solution. The mix was cold molded as a slug in a steel die; the die cavity in one die used for the purpose was ¼" in diameter and a total force of 1,000 pounds or higher was applied by a hydraulic press and maintained for a duration of 30 to 60 seconds on the slug.

The cold molded resistor slug was removed from the die cavity and a solderable silver paste was painted on opposite sides of the resistor and the resistor was fired. After firing, a tinned copper wire lead was applied at each of the opposite sides of the resistor by means of a soldering gun. The electric properties were as follows, where the total dry pressing effort was 40,000 p.s.i. and the firing temperature was 475° for a duration of 11 minutes:

| Compositions (Wt. percent) | | | Resistance (K ohms) | TCR (p.p.m./°C.) | VCR (percent/v.) |
|---|---|---|---|---|---|
| Thallic oxide $Tl_2O_3$ | Rutile $TiO_2$ | Glass Q-12 | | | |
| 20 | 30 | 45 | 6.0 | −85 | +0.0034 |
| 25 | 30 | 45 | 19.7 | −150 | 0 |

Example II

In the manufacture of a homogeneously mixed printed type resistor, the ratio of conductive thallium oxide powder to the lead borosilicate glass powder was between 2 and ⅓ by weight respectively and these powders were mixed for 30 minutes in a power mortar and pestle. During mixing the viscosity was increased suitable for screen printing by adding a small amount of butyl carbitol and ethyl cellulose.

A substrate of ceramic was prepared having a thermal coefficient of expansion (TCE) compatible to the matrix glass of the resistor composition. Preferable substrates are barium titanate or magnesium titanate or a mixture thereof. Onto the substrate, a commercially available solderable silver paste was screen printed at spaced apart spots to form terminals and the substrate was then fired at 700° to 750° for about 30 minutes.

A stripe of the mix of thallium oxide and glass of proper viscosity was printed on and between the fired silver paste terminals on the substrate. The size of standard strips of screen printing is 1.5 mm. wide and 4.5 mm. long between the terminals.

These articles were air dried at a temperature of 100° to 150° C. for a duration of 15 minutes and the articles were fired in a semi-automatic tunnel kiln. Tin coated copper wire leads were then soldered onto the silver terminals by means of a soldering gun.

The results obtained are as follows; wherein the heat treatment temperature indicated was the peak temperature measured along the length of the kiln, and the firing time in minutes was the duration of the period in which each sample was within the confines of the kiln:

| Compositions (wt. percent) | | | TCR (p.p.m./° C) | VCR (percent/v.) | Noise, Decibels | Resistance (ohms per square) | Heat Treat. (° C./min.) |
|---|---|---|---|---|---|---|---|
| Thallic Oxide Tl₂O₃ | Thallous Oxide Tl₂O | Lead Borosilicate Glass | | | | | |
| 53.3 | 6.7 | 40.0 | +200 | +0.019 | ----- | 125 | 600/15 |
| 44.5 | 5.5 | 50.0 | −27.5 | −0.0072 | −4.1 | 900 | 600/15 |
| 40.0 | 5.0 | 55.0 | −42.1 | −0.0043 | +2.3 | 1.6 K oms | 600/15 |
| 35.5 | 4.5 | 60.0 | −108.7 | −0.0017 | +1.8 | 13 K ohms | 600/15 |
| 31.1 | 3.9 | 65.0 | −114 | −0.0024 | +3.5 | 32 K ohms | 600/15 |
| 26.7 | 3.3 | 70.0 | −112 | −0.0026 | +12.8 | 80 K ohms | 600/15 |

*Example III*

In the process of manufacture of a heterogeneous mix type of printed resistor, thallium oxide powder and lead borosilicate glass frit were mixed and sintered together at a temperature between approximately 800° and 1,000° C. This composition was fritted by re-grinding to a fineness −325 mesh, and was mixed again with the same amount of thallium oxide powder and a temporary binder. The latter mix was printed on a silver terminalled substrate prepared according to Example II and was then fired at 600° C. for 15 minutes. Metal wire leads were soldered to the silver terminals and the properties of the resistors was determined as follows:

| Compositions (Grams) | | Added Tl₂O₃ (grams) after fritting | R (ohms/sq.) | TCR (p.p.m./°C.) |
|---|---|---|---|---|
| Tl₂O₃ | Lead Borosilicate Glass | | | |
| 50 | 50 | 47.1 | 50 | +140 |
| 37.5 | 62.5 | 47.1 | 1 K ohms | +90 |
| 0 | 100 | 47.1 | 2.7 K ohms | −20 |

Within the broader aspects hereof, any lead borosilicate glass is satisfactory, for example, Harshaw Chemical Company type Q12 frit; the general mix of the glass and thallium oxide will be in proportions along the foregoing lines, with the balance being TiO₂ or other fillers depending upon the desired amount, up to the previously indicated weight percentage of 50% of filler.

I have discovered that if the foregoing amorphous glass frit and crystalline thallium oxide mixes are heated sufficiently high to go completely into solution together, the resulting solution can be cooled and then recrystallized by heating to form a precipitated metallic oxide phase within the supercooled glass. In contrast to the foregoing sintered or fused mixtures in which the firing temperatures never exceed 650° C., I have found it preferable to raise the temperature materially thereabove, as for example, 1000° C. or 1400 C. in order to produce a solution. This solution when cooled rapidly retains completely amorphous characteristics, being translucent and in a supercooled liquid state. I then reheat the composition and allow sufficient time for recrystallization action to precipitate out the thallium oxide as minute crystallites forming an opaque black mass. The crystalline structure within this black glass makes the composition electrically conductive and highly useful as a resistor in film, coat, or filled form.

More conveniently, into a body of glass already in the molten state, I dissolve an amount of thallium oxide according to the foregoing frit and thallium oxide proportions, the temperature of the solution being in the range between approximately 750° C. and 1,000° C. The solution is cooled rapidly to reach a supercooled solution state, as by filling individual small die cavities therewith, and then recrystallization is accomplished by bringing the temperature into a preferred range between 200° C. and 650° C., for a reheat period between 5 minutes and a few days. If the small die cavities mentioned are provided with wire lead terminals projecting thereinto, the resulting individual bodies will have their resistor terminals permanently locked in situ as cast. In any case, a uniform, stable, conductive composition results.

It is evident from the foregoing that I have provided a novel and highly stable resistive composition for electrical resistance purposes. Both in the instance of my fused glass mix involving only the relatively low temperature necessary for the sintering, and in the instance of the higher heated and then supercooled complete solution in which a subsequent reheat produces recrystallization of the metal oxide as an in situ precipitate, the metal oxide provides a uniformly controllable, electrical path rendering an inorganic glassy composition conductive.

The present inventions have been described, but changes and modifications can be made in the composition and method, and some features of the inventions can be used in different combinations, all of which are equally comprehended by the foregoing description.

I claim:

1. A resistor composition characterized by low electrical noise, low voltage coefficient of resistance, and low temperature coefficient of resistance comprising finely divided particles of thallium oxide as the major conductive component dispersed in a matrix of borosilicate glass, the proportions of thallium oxide to the glass matrix being within the range, thallium oxide 95% to 20% by weight and matrix 5% to 80% by weight.

2. A resistor composition in accordance with claim 1 in which the finely divided particles of thallium oxide are less than 10 microns in size.

3. A resistor composition as described in claim 1 which includes an inorganic filler material selected from the group consisting of TiO₂, MgO, CaO, SrO, BaO, Al₂O₃, and ZrO₂, the amount of said filler present in the composition being up to 50% by weight of the composition.

4. A resistor composition as described in claim 3 wherein said borosilicate glass is a lead borosilicate glass and said finely divided particles of thallium oxide are less than 10 microns in size.

5. A resistor composition characterized by high stability and a low noise level consisting essentially of finely divided particles of thallium oxide dispersed in a glass matrix, the proportions of thallium oxide to the glass matrix being within the range, thallium oxide 95% to 20% by weight and matrix 5% to 80% by weight, the glass matrix being predominantly lead borosilicate glass and said particles of thallium oxide being less than 10 microns in size.

6. An electrical resistor comprising a substantially nonconductive substrate having a conductive coating on the surface thereof, said conductive coating comprising thallium oxide in finely divided form dispersed in a matrix of borosilicate glass, said thallium oxide constituting the major conductive component of said coating and constituting 20% to 95% by weight of the total of thallium oxide and glass.

7. Diphase inorganic resistor composition having high stability and low noise level characteristics comprising a substantially nonconductive amorphous borosilicate glass phase and a conductive phase, said conductive phase comprising a conducting material selected from the group consisting of thallic and thallous oxides and mixtures thereof, as the major conductive constituent of said conductive phase, said conducting material having been crystallized out of glass solution and been distributed throughout the amorphous glass phase, said composition being characterized by the proportions of conductive material to glass being within the range, thallic and thallous oxides and mixtures thereof 95% to 20% by weight, and amorphous glass 5% to 80% by weight.

8. Diphase inorganic resistor composition having a voltage coefficient of resistance below 0.035%/v. and a temperature coefficient of resistance below 200 p.p.m./° C., comprising a substantially nonconductive amorphous borosilicate glass phase and a conductive phase, said conductive phase comprising as its major constituent a conducting material selected from the group consisting of thallic and thallous oxides and mixtures thereof, said conductive phase being distributed in finely divided form throughout the amorphous glass phase and said conductive material being present in an amount within the range of from 20% to 95% by weight of the glass phase.

9. An electrical resistor having high stability and a low noise level comprising a substantially nonconductive substrate having a conductive coating on the surface thereof, said conductive coating consisting essentially of 95% to 20% by weight thallium oxide and 5% to 80% by weight lead borosilicate glass.

References Cited by the Examiner
UNITED STATES PATENTS

| 2,081,894 | 5/1937 | Meyer et al. | 252—518 XR |
| 3,052,573 | 9/1962 | Dumesnil | 252—520 |
| 3,088,921 | 5/1963 | Heischman | 252—520 |
| 3,110,685 | 11/1963 | Offergeld | 252—512 |

OTHER REFERENCES

Chemical Abstracts, vol. 47, col. 11975(i) (1953).
Chemical Abstracts, vol. 56, col. 2162(b) (1962).
Chemical Abstracts, vol. 56, col. 4381(b).

JULIUS GREENWALD, *Primary Examiner.*

ALBERT T. MEYERS, *Examiner.*